US010699185B2

(12) United States Patent
Guan et al.

(10) Patent No.: US 10,699,185 B2
(45) Date of Patent: Jun. 30, 2020

(54) CROP YIELD ESTIMATION USING AGRONOMIC NEURAL NETWORK

(71) Applicant: The Climate Corporation, San Francisco, CA (US)

(72) Inventors: Wei Guan, Fremont, CA (US); Erik Andrejko, Oakland, CA (US)

(73) Assignee: THE CLIMATE CORPORATION, San Francisco, CA (US)

( * ) Notice: Subject to any disclaimer, the term of this patent is extended or adjusted under 35 U.S.C. 154(b) by 755 days.

(21) Appl. No.: 15/416,694

(22) Filed: Jan. 26, 2017

(65) Prior Publication Data

US 2018/0211156 A1   Jul. 26, 2018

(51) Int. Cl.
| | | |
|---|---|---|
| *G06N 3/04* | (2006.01) | |
| *G06Q 10/04* | (2012.01) | |
| *G06Q 50/02* | (2012.01) | |
| *G06Q 10/06* | (2012.01) | |
| *A01B 79/00* | (2006.01) | |

(52) U.S. Cl.
CPC ......... *G06N 3/0454* (2013.01); *G06N 3/0445* (2013.01); *G06Q 10/04* (2013.01); *G06Q 10/06* (2013.01); *G06Q 50/02* (2013.01); *A01B 79/005* (2013.01)

(58) Field of Classification Search
CPC .... G06N 3/0454; G06N 3/0445; G06Q 10/04; G06Q 10/06; G06Q 50/02; A01B 79/005
See application file for complete search history.

(56) References Cited

U.S. PATENT DOCUMENTS

| | | |
|---|---|---|
| 2005/0234691 A1 | 10/2005 | Singh et al. |
| 2011/0282819 A1 | 11/2011 | Ball et al. |
| 2016/0215994 A1 | 7/2016 | Mewes et al. |

(Continued)

OTHER PUBLICATIONS

Liu et al, Neural Networks for Setting Target Corn Yields, 2000, University of Illinois at urbana-champaign (Year: 2000).*

(Continued)

*Primary Examiner* — Austin Hicks
(74) *Attorney, Agent, or Firm* — Elliot H. Karlin; Hickman Palermo Becker Bingham LLP

(57) ABSTRACT

Systems and method for computing yield values through a neural network from a plurality of different data inputs are disclosed. In an embodiment, a server computer system receives a particular dataset relating to one or more agricultural fields wherein the particular data set comprises particular crop identification data, particular environmental data, and particular management practice data. Using a first neural network, the server computer system computes a crop identification effect on crop yield from the particular crop identification data. Using a second neural network, the server computer system computes an environmental effect on crop yield from the particular environmental data. Using a third neural network, the server computer system computes a management practice effect on crop yield from the management practice data. Using a master neural network, the server computer system computes one or more predicted yield values from the crop identification effect on crop yield, the environmental effect on crop yield, and the management practice effect on crop yield.

14 Claims, 8 Drawing Sheets

(56) References Cited

U.S. PATENT DOCUMENTS

2018/0067605 A1* 3/2018 Lin .................. G06N 20/00
2018/0177136 A1* 6/2018 Reimann ............ G06Q 10/06

OTHER PUBLICATIONS

McDowell et al, Genomic Selection with Deep Neural Networks, 2016, Iowa state university (Year: 2016).*

Wilkinson et al, Crop yield prediction using multipolarization radar and multitemporal visible / infrared imagery, 2006, Remote sensing for agriculture (Year: 2006).*

The International Searching Authority, "Search Report", in application No. PCT?US18/12949, dated May 16, 2018, 12 pages.

Current Claims in application No. PCT/US 18/12949, dated May 2018, 6 pages.

* cited by examiner (a)

802 Receiving, at a Server Computing System, a Particular Dataset Relating to One or More Agricultural Fields, Wherein the Particular Dataset Comprises Particular Crop Identification Data, Particular Environmental Data, and Particular Management Practice Data 804 Using a First Neural Network Configured Using Crop Identification Data as Input and Crop Yield Data as Output, Computing a Crop Identification Effect on Crop Yield for the One or More Agricultural Fields from the Particular Crop Identification Data 806 Using a Second Neural Network Configured Using Environmental Data As Input and Crop Yield Data as Output, Computing an Environmental Effect on Crop Yield for the One or More Agricultural Fields from the Particular Environmental Data 808 Using a Third Neural Network Configured Using Management Practice Data as Input And Crop Yield Data as Output, Computing a Management Practice Effect on Crop Yield for the One or More Agricultural Fields from the Particular Management Practice Data 810 Using a Master Neural Network Configured Using Crop Identification Effects on Crop Yield, Environmental Effects on Crop Yield, and Management Practice Effects on Crop Yield as Input and Crop Yield Data as Output, Computing One or More Predicted Yield Values for the One or More Agricultural Fields from the Crop Identification Effect on Crop Yield, the Environmental Effect on Crop Yield, and the Management Practice Effect on Crop Yield

FIG. 8

CROP YIELD ESTIMATION USING AGRONOMIC NEURAL NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2017 The Climate Corporation.

FIELD OF THE DISCLOSURE

The present disclosure is in the technical field of computer systems useful in training and executing neural networks. The disclosure is also in the field of computer systems programmed or configured to use a plurality of neural networks trained with agricultural data as inputs to produce crop yield values as outputs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Farmers often must make planting decisions regarding one or more fields based on incomplete information. Generally, the goal of the farmer is to maximize crop yield, crop quality, and/or profits from sales of the crop. Yet it is often unclear which combination of crop types, soil types, weather events, and management practices will lead to the maximization of these values.

Agronomic modeling techniques are often used to model interactions between a crop and the environment. For instance, one agronomic model may be used to simulate a crop's growth based on an amount of nutrients the crops receive. Ideally, by using a large number of accurate models, every interaction that affects a crops growth can be simulated, thereby granting perfect knowledge of yield outcomes when a crop is planted.

Unfortunately, the use of such a large number of models to capture every interaction between the crop and the environment would be computationally expensive. Additionally, the strength of the agronomic model is limited by the knowledge of the person generating the agronomic model. Thus, an agronomic model is unable to account for relationships that are not understood prior to the model's creation.

Neural networks have become increasingly popular in solving various types of problems without requiring relationships to be specified in advance. Generally, neural networks consist of a series of equations, each of which are configured to transform a plurality of different inputs into one or more outputs. As the neural networks are trained, weights are assigned to the series of equations in order to ensure that the neural network produces correct outputs from the inputs. A benefit of neural networks is that they can capture relationships that are not fully understood by the domain experts.

One weakness with neural networks is that they tend to work on a single type of input to produce a single type of output. In the case of agronomic modeling, there are various different types of inputs, including crop type, soil type, weather effects, and management practices, that are relevant to a crop's yield. The different types of inputs may be represented differently, as some inputs, like temperature, vary with time while other inputs, like soil type, vary spatially.

Thus, there is a need for a comprehensive neural network which can interact with various types of agricultural data in order to produce yield outcomes.

SUMMARY

The appended claims may serve as a summary of the disclosure.

BRIEF DESCRIPTION OF THE DRAWINGS

In the drawings:

FIG. 6 depicts an example embodiment of a spreadsheet view for data entry.

FIG. 8 depicts an example method for running an agronomic neural network.

DETAILED DESCRIPTION

Figure 1:
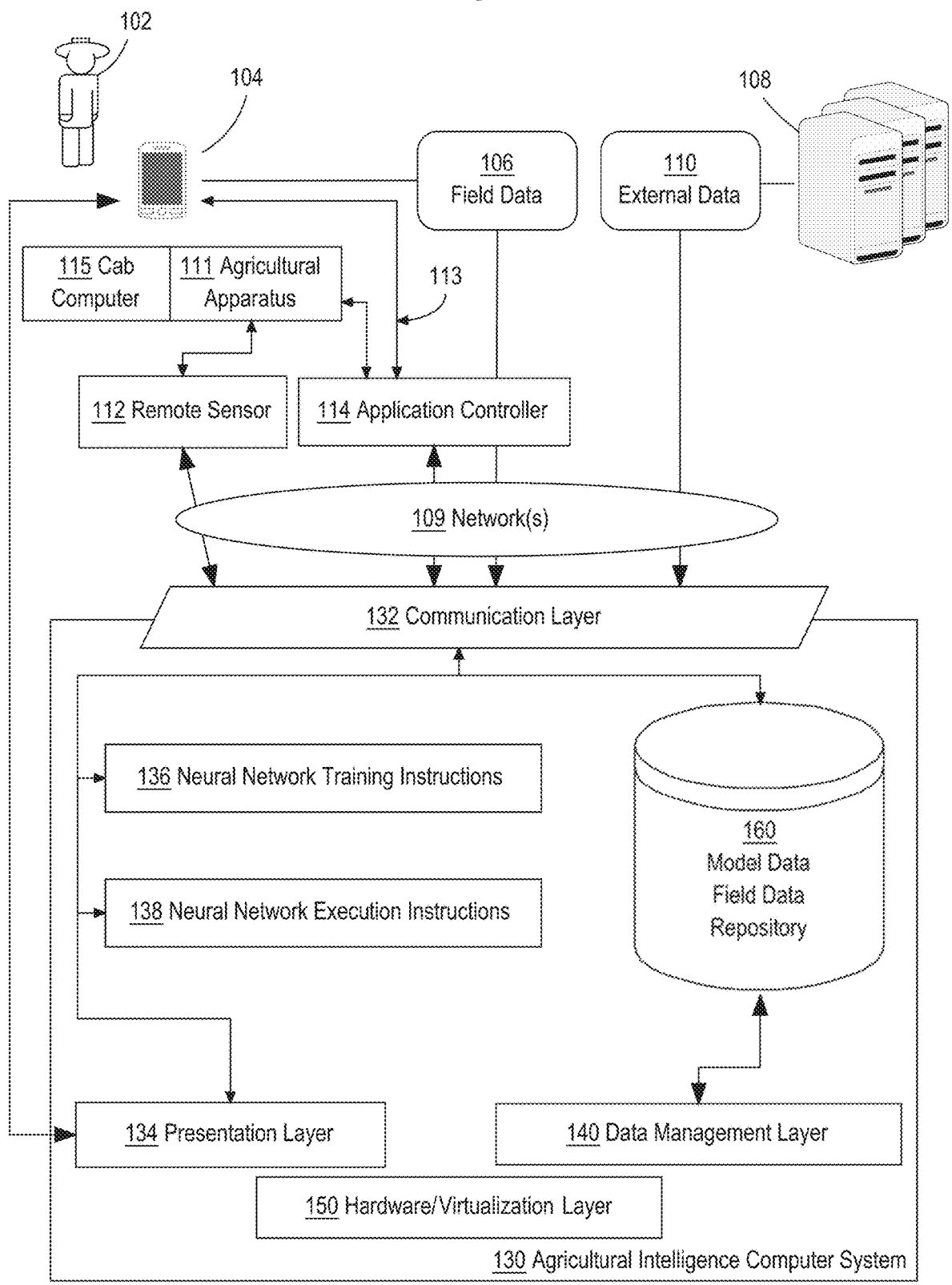
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. AGRONOMIC NEURAL NETWORK
   3.1. TRAINING DATA
   3.2. CROP IDENTIFICATION NEURAL NETWORK
   3.3. ENVIRONMENTAL NEURAL NETWORK 3.3.1. TEMPORAL ENVIRONMENTAL DATA
3.3.2. SPATIAL ENVIRONMENTAL DATA
3.3.3. LEARNED ENVIRONMENTAL EMBEDDING
3.4. MANAGEMENT PRACTICE NEURAL NETWORK
3.5. ADDITIONAL NEURAL NETWORKS
3.6. INTERMEDIATE CROSS SECTION EMBEDDINGS
3.7. MASTER NEURAL NETWORK
3.8. YIELD VALUES
4. APPLICATIONS
4.1. RUNNING THE NEURAL NETWORK
4.2. RECOMMENDATIONS
4.3. PREDICATIONS BASED ON NEW INFORMATION
5. BENEFITS OF CERTAIN EMBODIMENTS
6. EXTENSIONS AND ALTERNATIVES

1. General Overview

Systems and methods for generating and using an agronomic neural network configured to use a plurality of different types of data as inputs and produce crop yield values as outputs are described herein, and providing improved computer-implemented techniques for estimating the yield of agricultural crops in fields or to be planted. The agronomic neural network comprises a plurality of individual neural networks configured to produce values indicating an effect on a crop's yield. A first neural network is configured to accept crop identification data as input and generate a crop identification effect on total yield as output. A second neural network is configured to accept environmental data as input and compute an environmental effect on total yield as output. A third neural network is configured to accept management practice data as input and compute a management practice effect on total yield as output. A master neural network is configured to accept the crop identification effect on total yield, the environmental effect on total yield, and the management practice effect on total yield as inputs and produce one or more yield values as outputs.

In an embodiment, a method comprises receiving, at a server computing system, a particular dataset relating to one or more agricultural fields, wherein the particular dataset comprises particular crop identification data, particular environmental data, and particular management practice data; using a first neural network configured using crop identification data as input and crop yield data as output, computing a crop identification effect on crop yield for the one or more agricultural fields from the particular crop identification data; using a second neural network configured using environmental data as input and crop yield data as output, computing an environmental effect on crop yield for the one or more agricultural fields from the particular environmental data; using a third neural network configured using management practice data as input and crop yield data as output, computing a management practice effect on crop yield for the one or more agricultural fields from the particular management practice data; using a master neural network configured using crop identification effects on crop yield, environmental effects on crop yield, and management practice effects on crop yield as input and crop yield data as output, computing one or more predicted yield values for the one or more agricultural fields from the crop identification effect on crop yield, the environmental effect on crop yield, and the management practice effect on crop yield.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
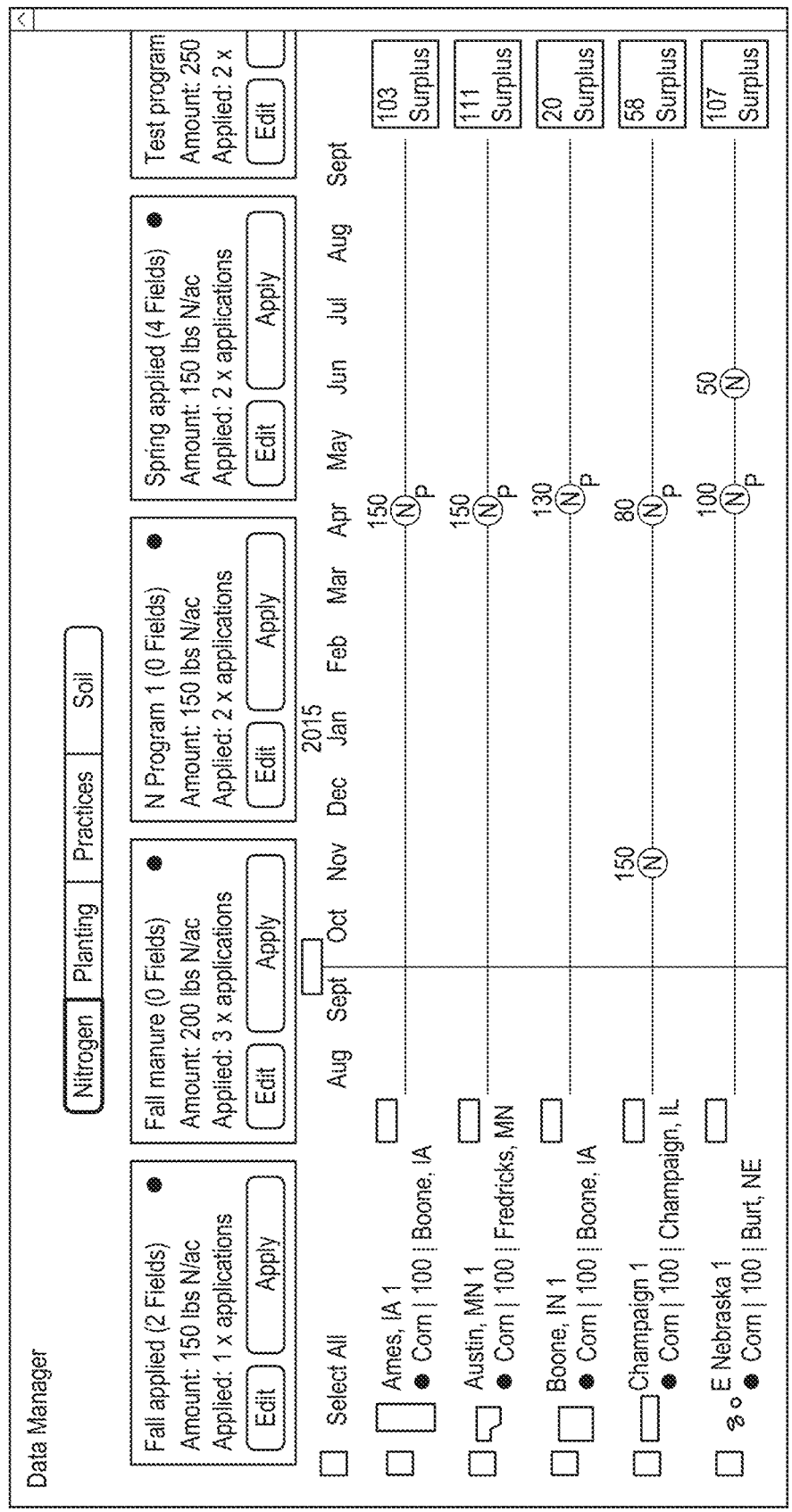
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

Figure 6:
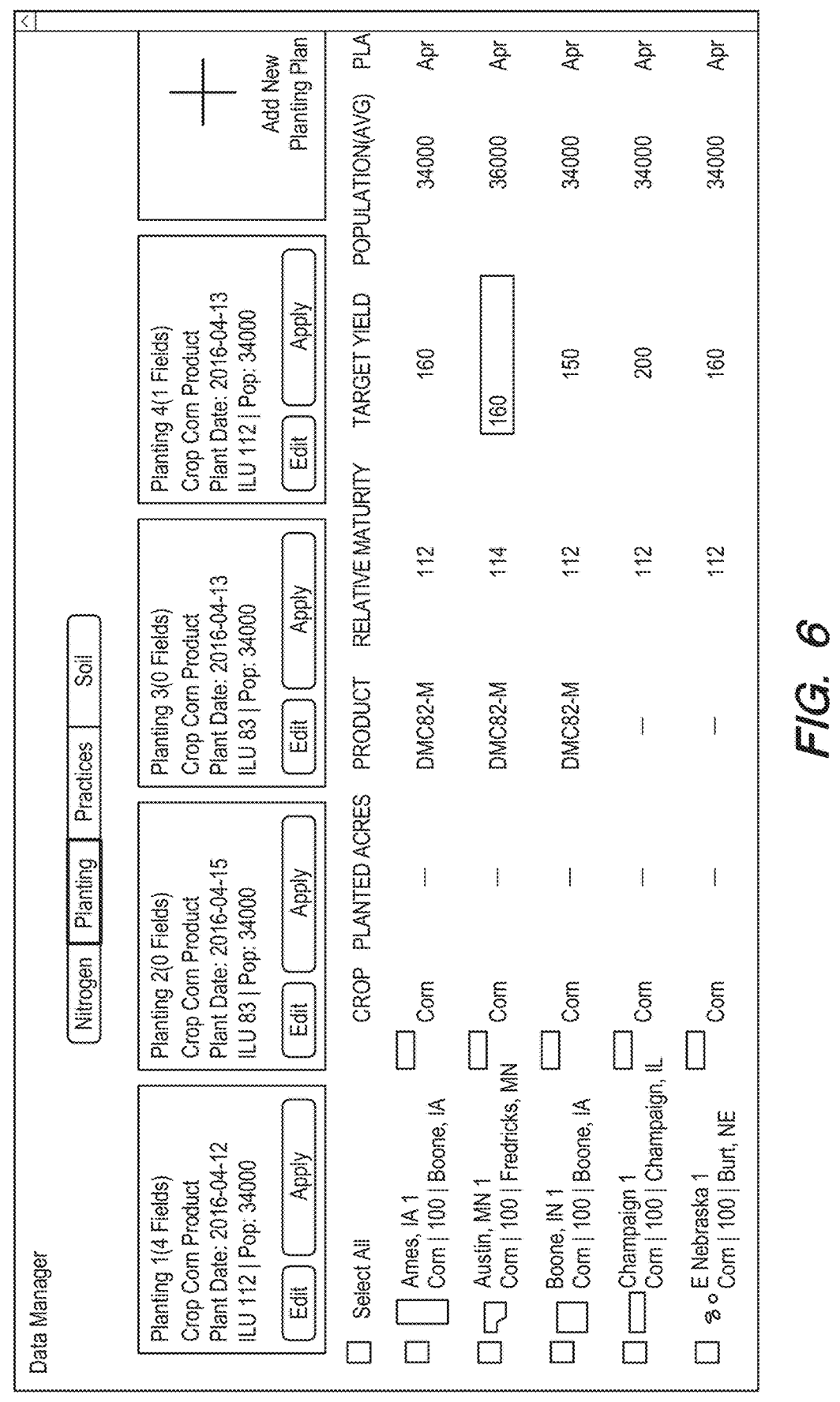

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Neural network training instructions 136 comprise one or more instructions which, when executed by agricultural intelligence computer system 130, cause agricultural intelligence computer system 130 to train a neural network using a plurality of datasets, each of which comprising crop identification data, environmental data, management practice data, and one or more yield values. Neural network execution instructions 138 comprise one or more instructions which, when executed by agricultural intelligence computer system 130, cause agricultural intelligence computer system 130 to use the trained neural network to compute one or more crop yield values from a particular dataset comprising particular crop identification data, particular environmental data, and particular management practice data.

In an embodiment, each of neural network training instructions 136 and neural network execution instructions 138 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the neural network training instructions 136 may comprise a set of pages in RAM that contain instructions which when executed cause performing the neural network training functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of neural network training instructions 136 and neural network execution instructions 138 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
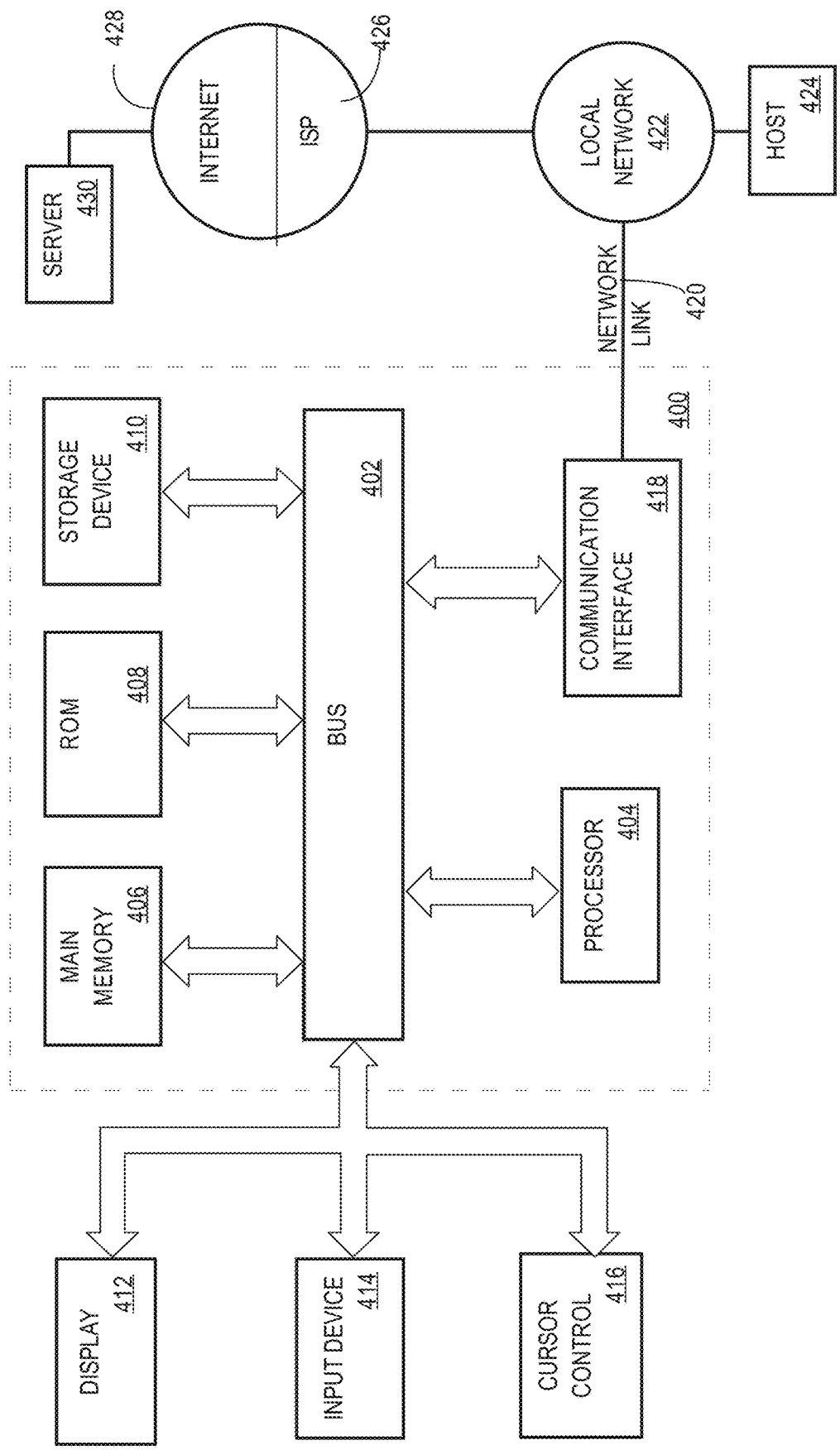
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

Figure 2:
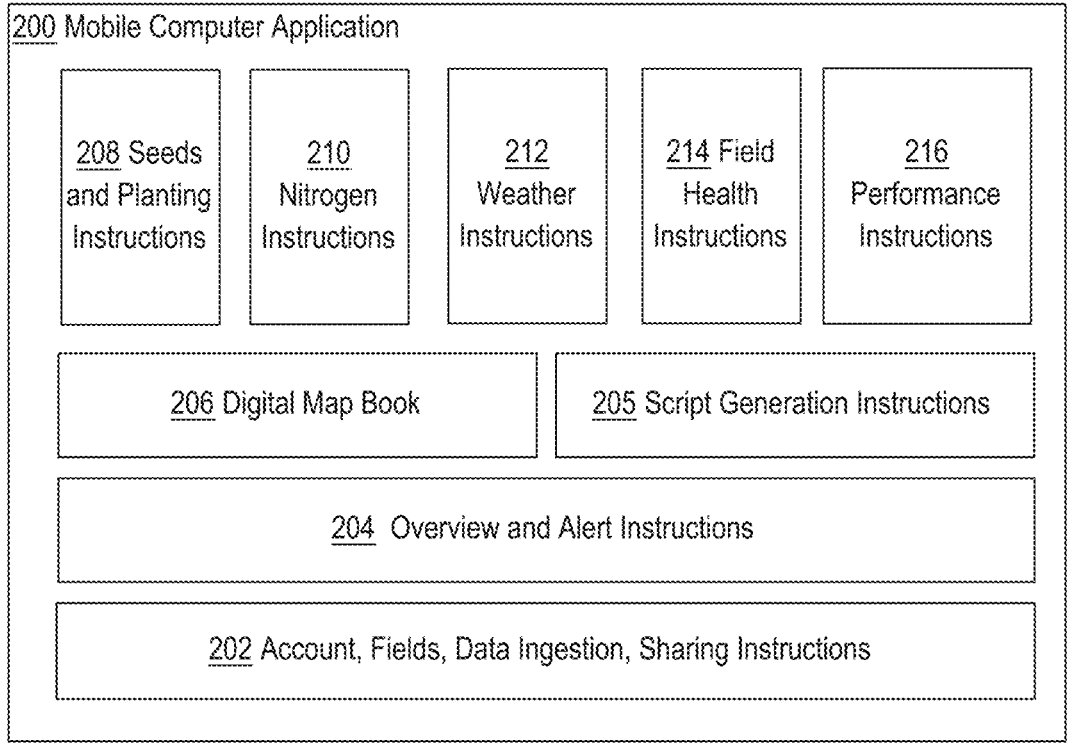
FIG. 2 illustrates two views of an example logical organization of sets of instructions in main memory when an example mobile application is loaded for execution.
Figure 2:
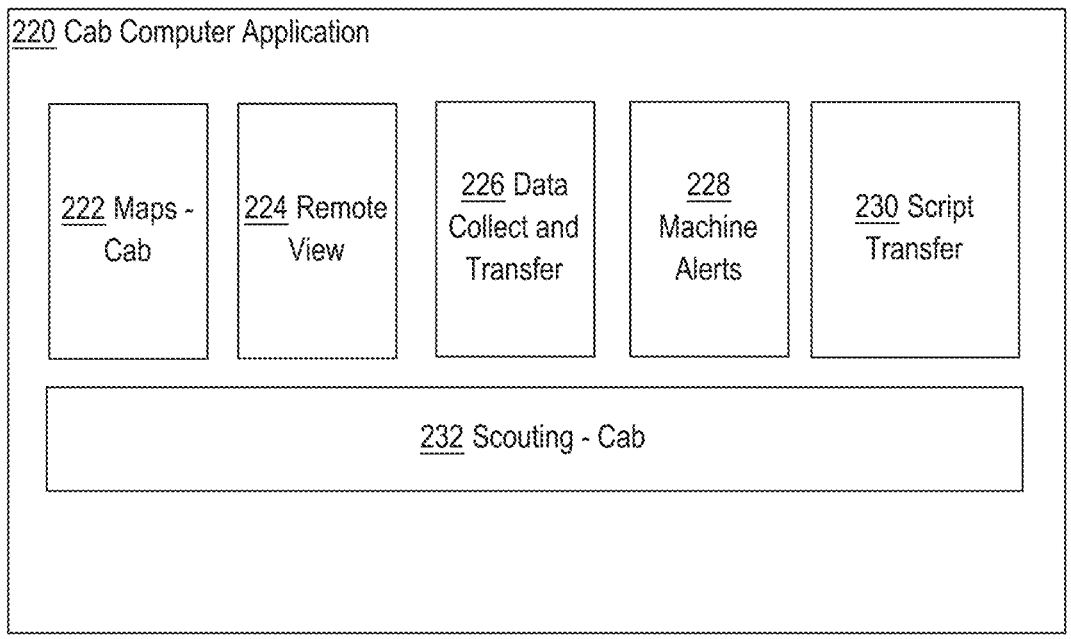

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4 Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
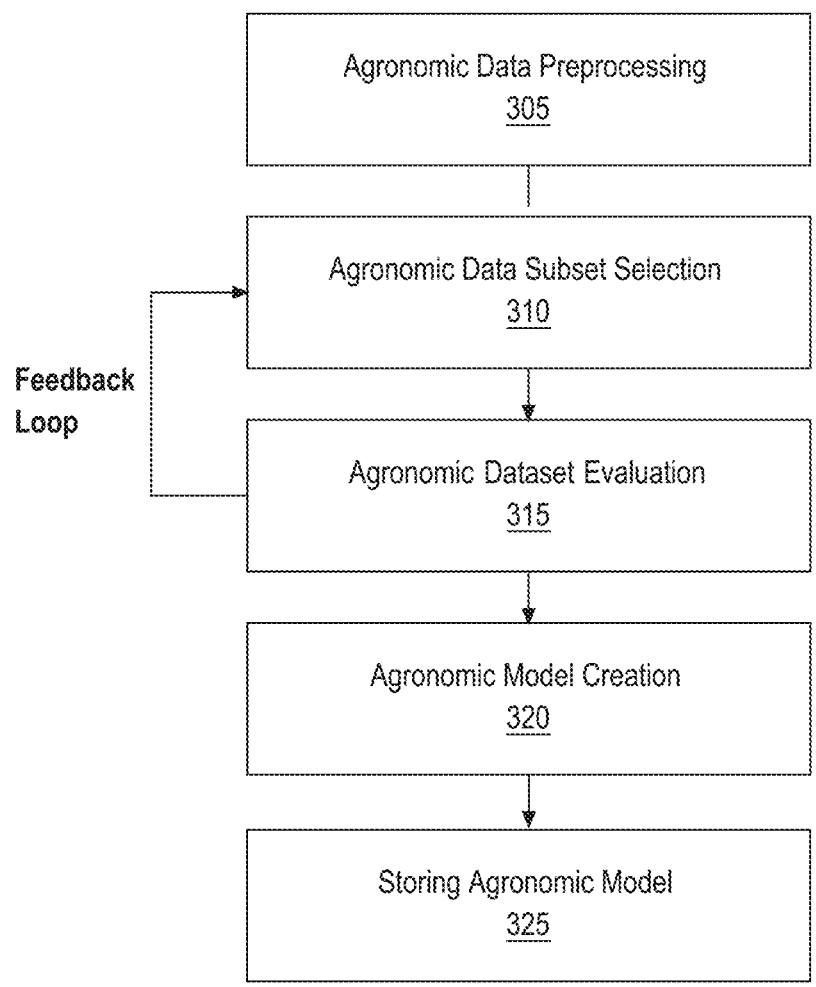
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Agronomic Neural Network

Figure 7:
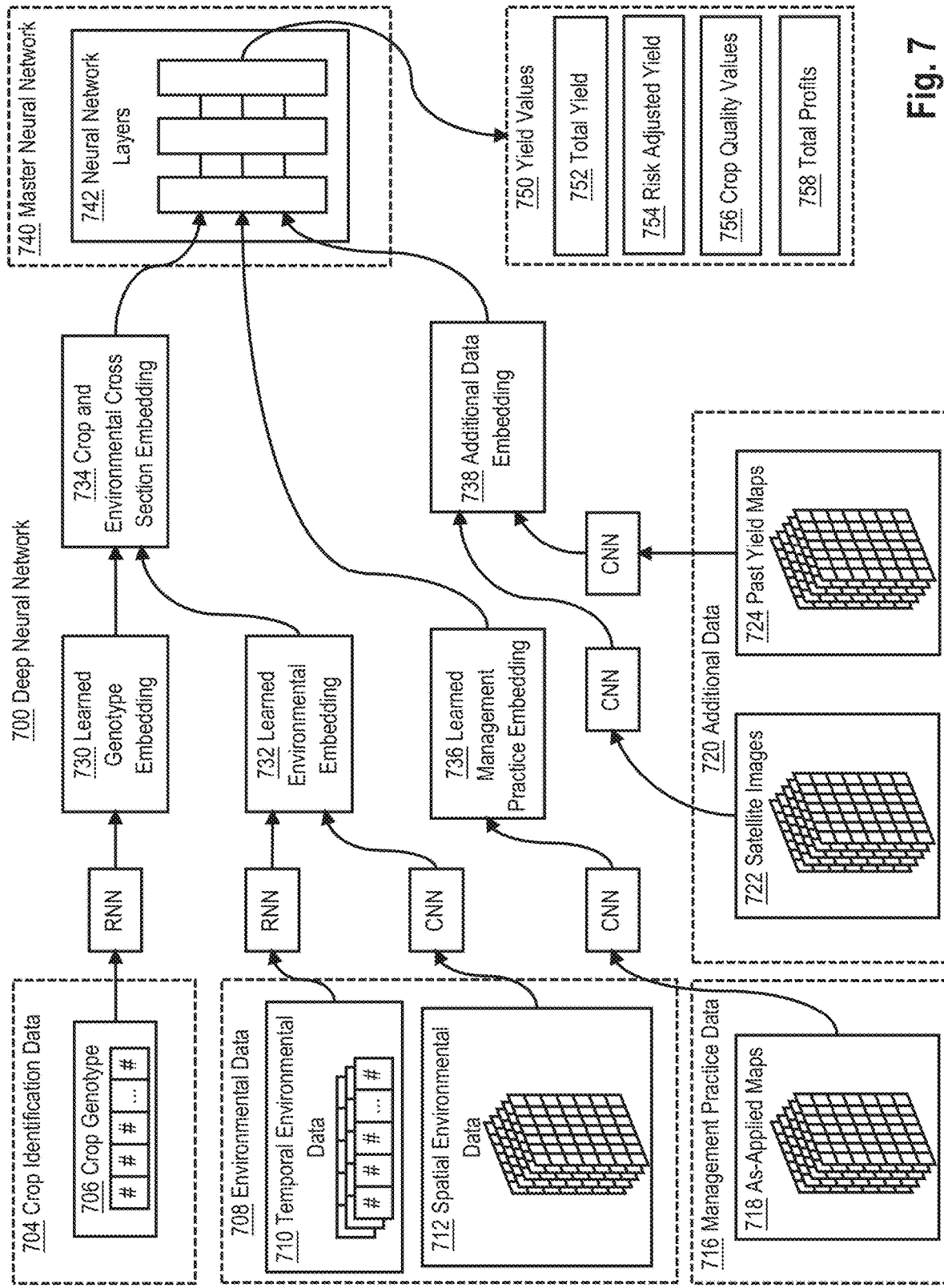
FIG. 7 depicts a neural network architecture for computing one or more predicted yield values from one or more crop related inputs.

FIG. 7 depicts a neural network architecture for computing one or more predicted yield values from one or more crop related inputs. The neural networks, as described herein, refer to a plurality of equations, each of which are configured to augment a plurality of inputs to produce an output. Individual weights are applied to each equation and augmented as the neural network is trained. Thus, the larger the amount of training information, the stronger the neural network becomes at producing accurate outputs.

Individual neural networks are described herein at high levels of generality based on inputs, outputs, and type of neural network. One of ordinary skill in the art given data on the inputs, outputs, and type of neural network would be able to construct a working embodiment using open source code. For example, open source software may be used to implement a particular architecture of a neural network such as the Visual Geometry Group (VGG) neural network created by the Department of Engineering Science, University of Oxford. Open source software for implementing the VGG neural network is available through TensorFlow, an open source software library developed by the Google Brain Team.

In FIG. 7, deep neural network 700 includes a plurality of inputs that may be used to train an agronomic neural network, including crop identification data 704, environmental data 708, management practice data 716, and additional data 720. While FIG. 7 depicts a plurality of neural networks trained in isolation, in an embodiment each individual neural network is trained as part of a cohesive system. Thus, the input data 704, 708, 712, 716, and 720 may be used to train a singular neural network or to train a series of neural networks as depicted in FIG. 7 which are then used to train a master neural network 740.

3.1. Training Data

Training data generally refers to the datasets that are used to train individual neural networks, deep neural network 700, or a combination of the two. Each dataset corresponds to the growth cycle of one or more crops on one or more fields. Each dataset used in training deep neural network 700 includes at least a yield value for the one or more crops. Yield values are described further herein, but they generally correspond to a value representing the completion of a growing cycle. Thus, a proper training dataset corresponds to a crop that has been planted, matured, and been harvested.

Training data also includes one or more of crop identification data 704, environmental data 708, management practice data 716, and additional data 720. While the better training datasets will include each type of data, individual neural networks may still be trained using some datasets that do not comprise each of the data types. For example, datasets that comprise crop identification data 704 and environmental data 708 would be useful in capturing the cross section of effects on total yield from the crop type and the environment, though data comprising effects on the total yield from management practices would be missing. Thus, as with any neural network, the more complete the training data is, the better the performance of the neural network.

In an embodiment, individual neural networks are run on incomplete datasets, i.e. datasets that are missing one or more of the data types used to train deep neural network 700. In an embodiment, when an incomplete dataset is used, missing datatypes are assumed to be held constant. Thus, in the example above, average values may be used for management practice data 716 when training the deep neural network using a dataset comprising crop identification data 704 and environmental data 708.

Datasets may be provided through external data 110 and/or field data 106. For example, various crop studies may contain data on crop types, weather events, management practices, and additional information. The data from the crop studies may be combined into a plurality of datasets for training deep neural network 700. Additionally, datasets may be provided by field manager computing devices 104. Individual farmers may send data regarding their fields to agricultural intelligence computer system 130. Agricultural intelligence computer system 130 may track additional data of the fields for the individual farmers. For example, agricultural intelligence computer system 130 may receive temperature and precipitation data from one or more sensors. Once a field has been harvested, the field manager computing device 104 may send yield data to agricultural intelligence computer system 130. Using the tracked data and the received data, agricultural intelligence computer system 130 may generate a new dataset for training deep neural network 700.

3.2. Crop Identification Neural Network

In an embodiment, a first neural network is trained using crop identification data 704. Crop identification data 704 may include input used to distinguish one type of crop over a different type of crop. For example, crop identification data may include the relative maturity of a seed that is planted on a field. Crop identification data may also include indicators for a type of crop. For example, a first value in an array of values may pertain to a type of crop, such as corn, cotton, or wheat while a next series of values identifies the individual breed of the crop, such as by the relative maturity of the seed.

In an embodiment, crop identification data 704 includes crop genotype 706. Crop genotype 706 may comprise a plurality of values that identify the genotype of the particular crop that is planted on the field or the genome of the crop that is planted on the field. The crop genotype may be compressed into a vector of values representing a DNA sequence of the crop. Additionally or alternatively, the crop genotype 706 may comprise one or more single nucleotide polymorphisms (SNPs). While the genome for a particular crop may be in the order of 50,000 values, using one or more SNPs allows for a similar amount of information to be compressed into a smaller number of values.

In an embodiment, crop genotype 706 may include one or more portions of a genome of a crop. For example, scientific research on genomes for corn may indicate which portions of the genome are most highly correlated to differences in crop yield. Instead of using the entire genome of the corn crop to train and use the crop identification neural network, the crop identification neural network may be built using just the portions of the genome sequence that have been determined to have a correlation to crop yield. Thus, when crop information is received for a particular field, the agricultural intelligence computer system 130 may be programmed or configured to identify particular portions of the crops genome based on portions of the crop genome that were used to train the crop identification neural network.

In an embodiment, deep neural network 700 includes a recurrent neural network (RNN) for computing effects on crop yield from crop identification data 704. For example, an RNN may be trained using crop genomes as input and yield values as output. As the RNN is trained, the RNN may learn which elements of the crop genome have an effect on yield and which elements of the crop genome do not have an effect on the yield. Example embodiments of the RNN for computing effects on yield based on crop identification data include long short term memory neural networks (LSTMs) and gated recurrent unit neural networks (GRUs). The use of LSTMs or GRUs allows the neural network to retain information regarding crop yield effects regardless of when the information was introduced into the neural network.

In an embodiment, the RNN is used to compute a learned genotype embedding 730. The embedding layers, as described herein, refer to intermediary layers that contain information relevant to the effects of data input on the crop yield. These embedding layers allow the master neural network to be run on a smaller amount of data, thereby improving the performance of the master neural network by reducing the processing power for training and running the master neural network and reducing the time it takes to train and run the master neural network. In the case of the crop identification data 704, the RNN encodes effects on crop yield from the genotype of the crop into a smaller number of values that can later be used in a master neural network to compute one or more yield values.

While each embedding is described as an encoding of an effect on the total yield based on particular data, each individual embedding is not encoded to be dispositive on their own. Each embedding is configured during the training stage to include useful information regarding the input data that may have an effect on the total yield. The information included in a first embedding is designed to interact with information included in a second embedding. For example, certain crop genotypes may be more resistant to high temperatures than other crop genotypes. Thus, the learned genotype embedding 730 may contain information which identifies how strongly the effects of high temperatures in the learned environmental embedding will influence the total crop yield.

3.3. Environmental Neural Network

In an embodiment, a second neural network is trained using environmental data 708. Environmental data 708 may include any information about the environment during a growing season of a crop. For example, environmental data 708 may include information about weather, such as temperature, precipitation, snow pack, wind speeds, and occurrence of abnormal events such as hurricanes, flooding, and earthquakes. Additionally or alternatively, environmental data 708 may include properties of each field, such as topography and soil properties. In an embodiment, environmental data is broken up into one or more of temporal environmental data, spatial environmental, or spatiotemporal environmental data.

3.3.1. Temporal Environmental Data

Temporal environmental data 710 includes information about the environment that changes over time, but is treated as being consistent over an entire field. Temporal environmental data 710 may be stored as one or more time series, i.e. a vector of values each of which represents a measurement or estimate at a particular time in a growing season. The time series may include values for each minute, hour, day, and/or week depending on the time series. For example, in the case of precipitation, hourly precipitation levels may be more useful for covering small, convective storms while daily temperature levels may be used to minimize the amount of data stored and used in the training and processing of the neural networks. Temporal environmental data 710 may include, but is not limited to, any of daily temperature, daily precipitation level, daily snow pack level, or daily occurrence or nonoccurrence of abnormal events.

In an embodiment, temporal environmental data 710 may comprise a plurality of time series for a particular type of data. For example, three (3) time series may be used for temperature for each field: a highest temperature time series, a lowest temperature time series, and an average temperature time series. The highest temperature time series, as way of example, may include a series of data values representing the highest temperature as measured by a thermometer over a field for each day of a growing season starting at the planting date.

In an embodiment, deep neural network 700 includes a recurrent neural network (RNN) for computing effects on crop yield from temporal environmental data 708. For example, an RNN may be trained using time series as input and yield values as output. Each time series may be identified as a different input for a single convolution neural network. Alternatively, each time series may be used as inputs for their own RNN. The resulting effects on yield from each of the time series may then be used as inputs in a temporal environmental neural network in order to compute a total effect on yield from a plurality of different time series. Example embodiments of the RNN for computing effects on yield based on temporal environmental data include long short term memory neural networks (LSTMs) and gated recurrent unit neural networks (GRUs).

3.3.2. Spatial Environmental Data

Spatial environmental data 712 includes information about the environment that changes spatially, but is treated as being consistent over time. Spatial environmental data 712 may be stored as one or more stacked spatial layers, i.e. matrices of values each of which represent a measurement or estimate at a particular location on the field. For example, each element of a first matrix may represent a single five meter by five meter pixel that corresponds to a location on the field. Thus, the first element of the matrix may comprise a measurement or estimate at the top left five meter by five meter portion of the field. The pixel size for different types of spatial data may differ, although the pixel size for a particular type of data may remain constant for each input of the same type of data. For example, topography maps of the field may be available at higher resolutions than soil property maps of the field. Thus, the spatial resolution between the topography maps and the soil property maps may differ. Yet each topography map for each field of the training data may use the same pixel size.

In an embodiment, spatial environmental data 712 comprises a plurality of spatial maps for a particular type of data. For example, the soil property maps may include a first map for sand content of the soil, a second map for silt content of the soil, and a third map for clay content of the soil. Additional spatial maps may include, but are not limited to, nitrogen content of the soil, soil type, and organic carbon content in the soil. Spatial environmental data 712 may additionally include different layers of soil properties. For example, organic carbon content in the soil may be measured at a top layer and one or more subsurface soil layers.

Where spatial elements are assumed to change over time, a plurality of spatial environmental maps may be used as spatiotemporal data. For example, moisture content in soil may change daily based on water application, precipitation, temperature, and crop uptake of water. A plurality of moisture content maps may be used as input data into a neural network where each moisture content map identifies moisture content in a plurality of locations at a different point in the growing season.

In an embodiment, deep neural network 700 contains a convolutional neural network (CNN) for computing effects on crop yield from spatial environmental data. A convolutional neural network is capable of learning from image data, such as spatial environmental data 712. As each data point represents a pixel, the convolutional neural network may track effects of nearby pixels on each other and map an effect on the yield from various spatial maps. As with the recurrent neural networks, each spatial map may correspond to its own convolutional neural network, each spatial map may be used as a different input for a comprehensive neural network, or any combination of spatial maps may be used as different inputs for a convolutional neural network. For example, in the case of spatiotemporal data, each map of the plurality of maps may be used as different inputs into the convolutional neural network.

3.3.3. Learned Environmental Embedding

In an embodiment, deep neural network uses one or more RNNs for temporal environmental data 710 and one or more CNNs for spatial environmental data 712 to generate learned environmental embedding 732. The learned environmental embedding identifies a cross section between temporal environmental factors and spatial environmental factors. As with the learned genotype embedding 730, the learned environmental embedding 732 encodes information relevant to a total effect on crop yield based on all environmental data.

While FIG. 7 depicts a single embedding stage for environmental data, in an embodiment each CNN and RNN produces an embedding for a particular type of data. For example, a first embedding based on daily precipitation vectors computed through an RNN may encode effects of daily precipitation on total yield while a second embedding based on topography maps computed through a CNN may encode effects of the topography on total yield.

Each of the individual embeddings may retain their individual properties. For example, time series embeddings may retain the properties of linear vectors while spatial map embeddings may retain the properties of matrices. Each embedding may be used as an input in an environmental data neural network which produces a combined embedding of environmental effects on total crop yield. The learned environmental embedding 732, as a combination between time series data and spatial data, may be three dimensional. For example, the learned environmental embedding 732 may be stored as a three dimensional matrix wherein two dimensions represent space and the third dimension represents time.

3.4. Management Practice Neural Network

In an embodiment, a third neural network is trained using management practice data 716. Management practice data 716 may include information regarding management practices of one or more fields. For example, management practice data may include tillage information, including tillage type, seed depth, and planting population, nutrient application, nutrient inhibitor application, water application, and any other management practices pertaining to the one or more field.

Management practice data 716 may be stored as as-applied maps 718. As-applied maps 718 may be stored as one or more stacked spatial layers, i.e. matrices of values each of which represent a measurement or estimate at a particular location on the field. Additionally, one or more added values may indicate timing of applications. For example, an as-applied fertilizer map may contain a plurality of pixels, each of which identify, for a particular area of the field, an amount of fertilizer that was applied. The as-applied fertilizer map may additionally contain one or more pixels that identify the timing of the application. For example, a first value of a matrix representing the as-applied map may indicate a number of days into the growing season when the fertilizer was added. The rest of the matrix may begin at the next row and column to represent the spatial application of the fertilizer.

Additionally or alternatively, some timing information may be stored as a separate time series. For example, a first time series may indicate which days included an application of water to the field. A corresponding matrix may indicate application amounts across the field. Separating out the timing information from the application amount information allows the deep neural network 700 to identify effects of applying water at different times as well as effects of applying water at different rates.

In an embodiment, deep neural network 700 includes a CNN for computing effects on crop yield from practice management data 716. For example, a CNN may be trained using practice management data as inputs and crop yields as outputs. As with the recurrent neural networks, each spatial map may correspond to its own convolutional neural network, each spatial map may be used as a different input for a comprehensive neural network, or any combination of spatial maps may be used as different inputs for a convolutional neural network.

In an embodiment, the CNN is used to compute a learned management practice embedding 736. The learned management practice embedding 736 encodes information relevant to a total effect on crop yield based on all of the individual management practices. Thus, the learned management practice embedding 736 includes combinations of effects from individual management practices, such as the as-applied population maps and the as-applied seed depth maps.

While FIG. 7 depicts a single embedding stage for management practice data, in an embodiment each CNN produces an embedding for a particular type of data. For example, a first embedding based on fertilizer application computed through a CNN may encode effects of fertilizer application on total yield while a second embedding based on planting population computed through a CNN may encode effects of the planting population on total yield. Each embedding may be used as an input in a management practice data neural network which produces a combined embedding of management practice effects on total crop yield.

3.5. Additional Neural Networks

In an embodiment, a fourth neural network is trained using additional data 720. Additional data 720 may include any additional information that may have a connection to the total crop yield on its own or in combination with any of the prior sources of data. Two examples of additional data 720 include satellite images 722 and past yield maps 724.

Satellite images 722 comprise one or more images of a particular field from one or more satellites. Satellite images 722 may contain several stacked layers of satellite images taken at the same time, but at different frequencies. For example, a first layer may correspond to a blue frequency, a second layer may correspond to a red frequency, and a third layer may correspond to an infrared frequency. Thus, for a single instance of satellite images 722, three different matrices may be used. Additionally or alternatively, one three dimensional matrix may represent the stacked layers of satellite images.

Satellite images 722 may correspond to particular times or periods of the growing season. For example, satellite images 722 may include images taken of the field at planting time and at a particular number of days into the growing season, such as one hundred days into the growing season. As another example, satellite images may be taken of fields periodically, such as every week. By keeping the satellite images consistent across different fields, the deep neural network 700 is able to properly weight the effects of variances in the satellite images. For example, a satellite image taken right after a crop is planted will likely look much different than a satellite image taken right before the last application of nitrogen through side dressing.

In an embodiment, data in each of satellite images 722 may identify when the satellite image was produced within the growing season. For example, a first value in a matrix may identify a number of days after planting when the satellite image was generated. The values representing the satellite image may begin on a new row and column of the matrix. Alternatively, data identifying when the satellite images were taken may be stored in a separate time series.

In an embodiment, satellite images 722 are produced at similar scale for each field. If satellite images are not properly scaled to each other, certain satellite images may appear to have a different effect on yield than equivalent satellite images in a different resolution. Thus, a standardized resolution may be used for each satellite images. Image interpolation techniques may be used on images of varying resolutions to standardize the image resolution.

Past yield maps 724 comprise prior yield maps for each set of fields. Thus, for a particular dataset, a past yield map may identify crop yields of the field for prior years. The past yield maps 724 may identify crop yield at particular resolutions. For example, each pixel of a past yield map may identify a crop yield for a 5 meter by 5 meter space on the field. Thus, the past yield maps 724 may be represented by a matrix of values. As with satellite images 722, past yield maps may be stored at a consistent resolution with each other.

In an embodiment, past yield maps 724 identify, for each location, one or more different yield values. For example, a first past yield map may identify total crop yield for each location. A second past yield map may identify a total profit for each location. A third past yield map may identify one or more crop values, such as protein quality for each location.

In an embodiment, deep neural network uses one or more CNNs for satellite images 722 and one or more CNNs for past yield maps 724 to generate additional data embedding 738. The additional data embedding identifies a cross section between any additional data values, such as satellite images and past yield maps. As with the other embeddings discussed herein, the additional data embedding 738 encodes information relevant to total effects on crop yield based on all additional data.

While FIG. 7 depicts a single embedding stage for additional data, in an embodiment each CNN produces an embedding for a particular type of data. For example, a first embedding based on satellite images taken at a particular stage of crop development computed through a CNN may encode correlations between satellite images and total yield while a second embedding based on past yield maps computed through a CNN may encode effects of the prior yield values on current total yield values. Additionally, individual types of data may be processed through one or more CNNs. For example, satellite images may be processed through a single CNN or through a CNN for each frequency image.

3.6. Intermediate Cross Section Embeddings

In an embodiment, deep neural network 700 contains one or more intermediate cross section embeddings. Intermediate cross section embeddings encode relationships between two or more disparate types of data. Intermediate cross section embeddings may be useful outside of deep neural network 700 in comparing crops on different fields. For example, two crops in different places of the world with the same crop and environmental cross section embeddings will respond similarly to the same management practices despite the fact that the two crops may be different and may have been exposed to different weather conditions.

One example of an intermediate cross section embedding is crop and environmental cross section embedding 734. Crop and environmental cross section embedding 734 encodes information relevant to the effects of a combination of the crop type and environmental conditions on the crop. The crop and environmental cross section embedding 734 may be trained using learned genotype embedding 730 and learned environmental embedding 732 as inputs.

While FIG. 7 depicts a limited number of cross section embeddings, embodiments may comprise any number of cross section embeddings. For example, one embodiment may include no cross section embedding. In such an embodiment, each type of data is used as a different input into one master neural network. In another embodiment, additional embeddings are added on to FIG. 7. For example, the crop and environmental cross section embedding 734 may be combined with the learned management practice embedding 736 to create a cross section between the two embeddings. Those two embeddings may be combined with the additional data embedding 738 in order to create a single embedding used for input into the master neural network 740.

3.7. Master Neural Network

In an embodiment, a master neural network 740 transforms a plurality of different inputs into one or more yield values 750. The master neural network may comprise a CNN with one or more neural network layers 742. In an embodiment, the master neural network is configured to accept as input at least the crop identification data 704, environmental data 708, and management practice data 716.

Alternatively, the master neural network 740 may be configured to accept as input one or more embeddings of information relevant to crop yield. The use of encoded information in the embeddings greatly reduces the amount of data used to train or run the master neural network 740 without significantly reducing the quality of the master neural network 740. In an embodiment, a single embedding layer is used as input into master neural network 740. The single embedding layer may encode all information relevant to crop yield from each data type. Additionally or alternatively, master neural network 740 may be configured to use a plurality of intermediate layers as input.

In an embodiment, each on neural network layers 742 comprise a plurality of nodes configured to transform the inputs into an output value. In embodiments where neural network layers 742 comprise a plurality of layers, outputs of each node may be used as inputs for each node in subsequent layers. Neural network layers 742 may also comprise a plurality of weights, each of which are associated with an individual node. Agricultural intelligence computer system 130 may use standard machine learning techniques to update the weights over time. For example, agricultural intelligence computer system 130 may update weights based on training data by minimizing the difference between outputs from the training data and actual yield values in the training data.

3.8. Yield Values

In an embodiment, master neural network 740 is configured to produce one or more yield values 750. Yield values 750 correspond to results of harvesting a crop. Yield values 750 may include one or more of total yield 752, risk adjusted yield 754, crop quality values 756, and total profits 758. One or more of yield values 750 may be trained as outputs to the master neural network 740. For example, the master neural network 740 may be trained using total yield 752 as a single output. Additionally or alternatively, master neural network 740 may be trained to produce an output comprising a plurality of values. For example, a vector output may include a first value for total yield 752, a second value for one or more crop quality values 756, and a third value for total profits 758.

Total yield 752 refers to a total production amount of a crop for a particular area. For example, total yield 752 may be measured in bushels of the crop per acre of land. The total yield 752 may be converted into an absolute yield by computing a product of the total yield 752 and the area of a relevant field. Thus, when the neural network is run on current data pertaining to a farmer's field, the neural network may be used to compute the total amount of a crop that the farmer's field will produce.

Risk adjusted yield 754 refers to a variability of the expected outcome. Risk adjusted yield 754 may be a single value, such as an expectation value, or a range of values identifying a probabilistic distribution of crop yield. Risk adjusted yield 754 may take into account uncertainty in the neural network and/or in input data. For example, training data for weather may be relatively precise as precipitation levels and temperature are measured directly. On the other hand, weather data may be less precise when the data is run on a particular dataset. For example, if the neural network is used to determine which crops and/or management practices to use prior to planting the crop, then the weather during the growing season may not be known. Instead, the neural network may be run based on weather predictions, such as temperature and precipitation forecasts. As the forecasts are merely predictions, each forecast may be associated with an uncertainty, thereby creating a range of possible weather values to be entered into the neural network. Master neural network 740 may compute a risk adjusted yield 754 by taking into account the uncertainty in the weather forecasts, such as by running the neural network with a range of inputs or multiple times with inputs sampled from a distribution of likely weather scenarios.

Crop quality values 756 refer to one or more values describing the quality of a produced crop. Examples of crop quality values 756 include nutrient values, such as protein content, physical values, such as weight, strength, hardness, vitreousness, and color, and generalized quality values such as grain quality, wheat quality, rice quality, and cotton quality. Generalized quality values may be commercially defined. For example, cotton quality may depend on a plurality of factors including strength, fiber length, and color.

Different crop quality values 756 may be used in training data as outputs of the deep neural network 700. For example, output training data for deep neural network 700 may include a vector comprising values for wheat protein content, hardness, color, moisture content, and weight. By using crop quality values 756 as output, deep neural network 700 is able to supply more information to a farmer than just the amount of a crop a field can produce. Crop quality values 756 allow a farmer to determine whether a particular field is optimal for producing a particular crop. For example, a field may be able to produce more corn than wheat, but at a much lower quality. In such a case, a farmer may wish to plant the higher quality wheat than the lower quality corn.

Total profits 758 refer to profits for sale of a crop produced on a field. As with total yield 752, total profits may be based on a particular area, such as dollars per acre, or aggregated to an absolute profits value. In an embodiment, deep neural network 700 is trained using actual total profits from past crop sales. In other embodiments, deep neural network 700 is trained using one or more other yield values, such as total yield 752, risk adjusted yield 754, and/or crop quality values 756. When deep neural network 700 is run on a new set of data, agricultural intelligence computer system 130 may be programmed or configured to compute expected values for total profits 758 based, at least in part, on one or more other yield values.

Expected values for total profits 758 may be computed based on expected value of the crop, the total yield of the crop, and the cost of producing the crop. Thus, an example equation may comprise $P=Y*E-C$ where P is the crop yield, E is the expected value of the crop, and C is a cost of production.

Expected value of the crop may be computed based on past crop sales for the crop. For example, the expected value of the crop may be the average sale price of the crop over the last five years. As another example, the expected value of the crop may be computed based on trends in crop sales. The cost of production may include seed cost, fertilization costs, estimated labor costs, watering costs, and any additional costs associated with planting, managing, and harvesting a crop.

Expected values for total profits 758 may additionally factor in one or more crop quality values 756. For example, expected values of the crop may be based on different crop qualities. Thus, a plurality of expected values may be identified for a particular crop type based on different crop qualities. The expected value may be based on crop sales over a prior period of time for different crop quality values. For example, past crop sales may be correlated to protein content for a particular crop type. Thus, the expected values for total profits 758 of the particular crop type may be computed based on a computed protein content for a crop of the particular crop type.

4. Applications

4.1. Running the Neural Network

FIG. 8 depicts an example method for running an agronomic neural network. A server computer system may execute instructions for running the neural network in response to receiving a request for estimated yield values based on one or more inputs.

At step 802, a particular dataset relating to one or more agricultural fields is received at a server computing system wherein the particular dataset comprises particular crop identification data, particular environmental data, and particular management practice data. The particular dataset may be received by a single source or a plurality of sources. For example, the server computing system may receive first data from field manager computing device relating to management practices for a field and second data from an external server computer relating to weather effects on the field.

Crop identification data may be received directly from a field manager computing device. For example, a user may identify, through an application executing on a field manager computing device, a crop that the user wishes to plant. In an embodiment, the user additionally selects a particular seed type for the crop. The server computer system may store data identifying genome sequences, SNPs, and/or portions of genome sequences for each seed type. Additionally or alternatively, the server computer system may request genome sequences, SNPs, and/or portions of genome sequences for seed types identified by a field manager computing device.

Environmental data for the particular dataset may be received from any of a plurality of sources. Soil data for a field may be received directly from a field manager computing device or one or more soil tests performed on the field. Additionally or alternatively, soil data may be received from one or more outside databases such as the Soil Survey Geographic Database (SSURGO). Weather data may be received from one or more external servers configured to produce weather forecasts for the future. Additionally or alternatively, weather data may be computed based on past weather data for a particular field. For example, a server computer system may compute average temperatures and precipitation for a field over a past five years using previously received temperature and precipitation measurements.

The field manager computing device may also send management practice data to the server computer system. For example, a user may identify, through an application executing on a field manager computing device, planned tillage information, including tillage type, seed depth, and planting population, planned nutrient application, planned nutrient inhibitor application, planned water application, and/or any other planned management practices.

In an embodiment, the server computer system stores data relating to the one or more agricultural fields. For example, the server computer system may receive data each year identifying a yield for a particular field. The server computer system may store the data as past yield maps. Thus, a first portion of the particular dataset may be stored in the server computer system, a second portion may be received from an external server computer, and a third portion may be received from a field manager computing device.

At step 804, a crop identification effect on yield for the one or more agricultural fields is computed from the particular crop identification data using a first neural network configured using crop identification data as input and crop yield data as output. For example, deep neural network 700 may generate a learned genotype embedding for the one or more agricultural fields through a recurrent neural network which accepts crop genotype as input.

At step 806, an environmental effect on yield for the one or more agricultural fields is computed from the particular environmental data using a second neural network configured using environmental data as input and crop yield data as output. For example, deep neural network 700 may generate a learned environmental embedding for the one or more agricultural fields through a recurrent neural network which accepts temporal environmental data as input and a convolution neural network which accepts spatial environmental data as input.

At step 808, a management practice effect on yield for the one or more agricultural fields is computed from the particular management practice data using a third neural network configured using management practice data as input and crop yield data as output. For example, deep neural network 700 may generate a learned management practice embedding for the one or more agricultural fields through a convolution neural network which accepts management practice data as input.

In embodiments, deep neural network 700 is run with additional data, such as past yield maps for the particular field or satellite images of the particular field. The additional data may also be used to generate a learned embedding for the one or more agricultural fields through a convolution neural network.

At step 810, one or more predicted yield values for the one or more agricultural fields is computed from the particular crop identification from the crop identification effect on crop yield, the environmental effect on crop yield, and the management practice effect on crop yield using a master neural network configured using crop identification effects on crop yield, environmental effects on crop yield, and management practice effects on crop yield as input and crop yield data as output. For example, a master neural network may be configured to accept embeddings for the one or more agricultural fields as inputs and produce one or more yield values as outputs.

4.2. Recommendations

In an embodiment, deep neural network 700 is used to generate recommendations for a particular field. For example, a user of a field manager computing device may request seed recommendations for a particular field through an application executing on the field manager computing device. The user may indicate a location of the particular field.

In response to the request, the server computer system may identify one or more inputs for the particular field. For example, the server computer system may access one or more past yield maps for the field. As another example, the server computer system may request soil maps for the field from the field manager computing device or one or more other computing devices. The server computer may also generate estimates for one or more inputs. For example, the server computer system may request weather forecasts and/or past weather measurements for the particular field from one or more external sources, such as a field manager computing device, one or more sensors, or an external server computer. Based on the weather information, the server computer may generate temporal environmental data for the particular field.

After the server computer system has set one or more inputs to be static, the server computer system may run the neural network with different inputs in order to identify highest yield values. For example, the server computer system may run the neural network with different crop genotypes and different management practices in order to identify a recommendation for the particular field. In an embodiment, the server computer system may store data which identifies a range of optimal management practices for different seed types and/or different weather conditions. Using the stored data, the server computer system may minimize the number of executions of deep neural network 700 by only using management practices that have been identified as optimal for the seed and/or weather patterns.

The server computer system may identify the best seed to plant based on continuous executions of deep neural network 700. The seed type that produces the highest total yield, risk adjusted yield, crop quality values, and/or total profits may be selected as the recommended crop. Additionally, if each seed type is input into the neural network with different management practices, the method described herein would allow for recommendation of a management practice for the selected seed type.

While the above example depicted the use of the neural network to recommend seed types, the neural network may also be utilized to recommend management practices for a particular area. For example, the user of the field manager computing device may identify the seed that is going to be planted. The server computer system may identify or estimate values for environmental data through external sources. The server computer system may also identify past yield maps for the particular field in order to improve recommendation accuracy. Using the fixed inputs, the server computer system may run the neural network with different inputs for management practice data. The server computer system may recommend the management practice data that led to the highest requested yield value.

4.3. Predictions Based on New Information

An additional strength of the deep neural network 700 is the ability to generate predictions based on new values for inputs that were not initially used to generate the neural network. As an example, deep neural network 700 may be used to generate predictions on how a new type of seed would react to different soil types, different weather types, and different management practices. The predictions would allow for optimization in use of new seed types or generation of new seed types without performance of physical tests.

In an embodiment, the genome for the new seed type is used as an input into deep neural network 700. As deep neural network 700 was trained on various genomes, deep neural network 700 is configured to be able to accept new types of genomes as inputs. The server computer system may then run the neural network with static values for environmental data and management practice data to determine how the new seed type would perform under such conditions.

In an embodiment, deep neural network 700 may also be used to identify ideal or less than ideal conditions for the new seed type. For example, deep neural network 700 may identify soil types that work best for a particular seed. In order to identify the best soil types for the new seed, the server computer system may select a plurality of soil types to test. For each soil type, the server computer system may execute the deep neural network 700 a plurality of times with different inputs for weather conditions and management practices. The server computer system may identify which soil types consistently produced the highest yield values and which soil types consistently produced the lowest yield values. The server computer system may perform similar methods to determine the best and worst weather conditions and management practice conditions for the seed.

In an embodiment, deep neural network 700 may be used to determine the new seed's susceptibility to changes in weather conditions, soil conditions, or management practices. Similar to identifying ideal conditions as described above, the server computer system may select slight changes in a condition type and execute deep neural network 700 repeatedly for each slight change. If yield values shift considerably from one temperature value to the next temperature value, then the seed may be identified as highly susceptible to changes in temperature. Alternatively, if the yield values barely shift across a range of temperatures, then the seed may be identified as less susceptible to changes in temperature.

5. Benefits of Certain Embodiments

Using the techniques described herein, a computer system can compute yield value based on a large amount of data of various types in a computationally efficient manner. Specifically, the different neural networks allow for creation of a master neural network that can accept different types of data inputs. The embeddings described herein reduce the computational cost of training the master neural network by reducing the number of inputs for the master neural network. Additionally, the use of a neural network provides reduces the required processing power of the computing device from what would be required for a comprehensive agricultural data model.

6. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
receiving, at a server computing system, a particular dataset relating to one or more agricultural fields, wherein the particular dataset comprises particular crop identification data, particular environmental data, one or more particular past yield maps of the one or more agricultural fields, and particular management practice data;
using a first neural network configured using crop identification data as input and crop yield data as output, computing a crop identification effect on crop yield for the one or more agricultural fields from the particular crop identification data;
using a second neural network configured using environmental data as input and crop yield data as output, computing an environmental effect on crop yield for the one or more agricultural fields from the particular environmental data;
using a third neural network configured using management practice data as input and crop yield data as output, computing a management practice effect on crop yield for the one or more agricultural fields from the particular management practice data;
using a fourth neural network configured using past yield maps as input and crop yield data as output, computing a particular past yield effect on crop yield for the one or more agricultural fields from the one or more particular past yield maps;
using a master neural network configured using crop identification effects on crop yield, environmental effects on crop yield, past yield effect on crop yield, and management practice effects on crop yield as input and crop yield data as output, computing one or more predicted yield values for the one or more agricultural fields from the crop identification effect on crop yield, the environmental effect on crop yield, the particular past yield effect on crop yield for the one or more agricultural fields, and the management practice effect on crop yield.

2. The method of claim 1:
wherein the particular crop identification data comprises one or more genome sequences for one or more crops corresponding to the particular dataset;
wherein the first neural network comprises a recurrent neural network configured to identify portions of the genome sequences that are correlated to effects on crop yield data.

3. The method of claim 2, wherein the recurrent neural network is a long short-term memory neural network.

4. The method of claim 2, wherein the recurrent neural network is a gated recurrent units neural network.

5. The method of claim 1, wherein the one or more predicted yield values comprises one or more of a risk adjusted yield value, a total profits value, or a crop quality value.

6. The method of claim 1:
wherein the particular environmental data comprises one or more time series of predicted weather events and one or more spatial maps of soil properties;
wherein the second neural network comprises a recurrent neural network for weather events and a convolution neural network for soil properties;
wherein computing the environmental effect on crop yield comprises generating a learned environmental embedding using the recurrent neural network for the weather events and the convolution neural network for the soil properties.

7. The method of claim 1:
wherein the particular dataset further comprises one or more particular satellite images of the one or more agricultural fields at particular periods of a growing season;
wherein the method further comprises:
using a fifth neural network configured using satellite images of fields at particular periods of the growing season as input and crop yield data as output, computing a particular satellite image effect on crop yield for the one or more agricultural fields from the one or more particular satellite images;
wherein the master neural network is further configured to use satellite image effect on crop yield as input;
wherein the one or more predicted yield values are further computed from the particular satellite image effect on crop yield for the one or more agricultural fields.

8. A system comprising:
a memory;
a first neural network stored in the memory, configured to compute a crop identification effect on crop yield using crop identification data as input;
a second neural network stored in the memory, configured to compute an environmental effect on crop yield using environmental data as input;
a third neural network stored in the memory, configured to compute a management practice effect on crop yield using management practice data as input;
a fourth neural network stored in the memory, configured to compute a past yield map effect on crop yield using past yield maps as input;
a master neural network stored in the memory, configured to compute one or more yield values using the crop identification effect on crop yield, the environmental effect on crop yield, past yield effect on crop yield, and the management practice effect on crop yield as inputs;
one or more processors communicatively coupled to the memory, configured to execute one or more instructions to cause performance of:
receiving a particular dataset relating to one or more agricultural fields, wherein the particular dataset comprises particular crop identification data, particular environmental data, one or more particular past yield maps of the one or more agricultural fields, and particular management practice data;
using the first neural network, computing a particular crop identification effect on crop yield for the one or more agricultural fields from the particular crop identification data;
using the second neural network, computing a particular environmental effect on crop yield for the one or more agricultural fields from the particular environmental data;
using the third neural network, computing a particular management practice effect on crop yield for the one or more agricultural fields from the particular management practice data;

using the fourth neural network, computing a particular past yield effect on crop yield for the one or more agricultural fields from the one or more particular past yield maps;

using the master neural network, computing one or more predicted yield values for the one or more agricultural fields from the particular crop identification effect on crop yield, the particular past yield effect on crop yield for the one or more agricultural fields, the particular environmental effect on crop yield, and the particular management practice effect on crop yield.

9. The system of claim 8:

wherein the particular crop identification data comprises one or more genome sequences for one or more crops corresponding to the particular dataset;

wherein the first neural network comprises a recurrent neural network configured to identify portions of the genome sequences that are correlated to effects on crop yield data.

10. The system of claim 9, wherein the recurrent neural network is a long short-term memory neural network.

11. The system of claim 9, wherein the recurrent neural network is a gated recurrent units neural network.

12. The system of claim 8, wherein the one or more predicted yield values comprises one or more of a risk adjusted yield value, a total profits value, or a crop quality value.

13. The system of claim 8:

wherein the particular environmental data comprises one or more time series of predicted weather events and one or more spatial maps of soil properties;

wherein the second neural network comprises a recurrent neural network for weather events and a convolution neural network for soil properties;

wherein the second neural network is further configured to compute the environmental effect on crop yield by generating a learned environmental embedding using the recurrent neural network for the weather events and the convolution neural network for the soil properties.

14. The system of claim 8, further comprising:

a fifth neural network stored in the memory, configured to compute a satellite effect on crop yield using satellite images as input;

wherein the particular dataset further comprises one or more particular satellite images of the one or more agricultural fields at particular periods of a growing season;

wherein the one or more processors are further configured to execute one or more instructions to cause performance of:

using the fifth neural network, computing a particular satellite image effect on crop yield for the one or more agricultural fields from the one or more particular satellite images;

wherein the master neural network is further configured to use satellite image effect on crop yield as input;

wherein the one or more predicted yield values are further computed from the particular satellite image effect on crop yield for the one or more agricultural fields.

* * * * *